(12) United States Patent
Okamoto et al.

(10) Patent No.: US 6,507,560 B2
(45) Date of Patent: *Jan. 14, 2003

(54) DISC CARTRIDGE

(75) Inventors: Tomomi Okamoto, Chigasaki (JP);
Kyuichiro Nagai, Fujisawa (JP);
Atsushi Inoue, Chigasaki (JP); Hiroaki Ono, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/840,048

(22) Filed: Apr. 24, 2001

(65) Prior Publication Data

US 2001/0015952 A1 Aug. 23, 2001

Related U.S. Application Data

(63) Continuation of application No. 09/299,745, filed on Apr. 27, 1999, now Pat. No. 6,400,678, which is a continuation-in-part of application No. 09/233,205, filed on Jan. 19, 1999, now Pat. No. 6,349,087.

(30) Foreign Application Priority Data

Apr. 28, 1998 (JP) ............................................ 10-118111

(51) Int. Cl.[7] ................................................ G11B 23/03
(52) U.S. Cl. ...................................................... 369/291
(58) Field of Search ................................. 369/289, 290, 369/291; 360/133

(56) References Cited

U.S. PATENT DOCUMENTS 6,282,059 B1 * 8/2001 Ikebe et al. ................. 360/133
6,324,158 B1 * 11/2001 Nakatsu et al. ............. 360/132

* cited by examiner

Primary Examiner—William Klimowicz
(74) Attorney, Agent, or Firm—Antonelli, Terry, Stout & Kraus, LLP

(57) ABSTRACT

A disc cartridge for receiving a disc-like recording medium therewithin which recording medium is capable of being inserted and removed from the disc cartridge. The disc cartridge includes an insertion and removal port opening and closing member, and the disc insertion and removal port opening and closing member is moved from the disc cartridge when taking out the recording medium. The disc cartridge has a locking member for locking the insertion and removal port opening and closing member. At least a part of a locking cancellation preventing member which prevents the locking member from moving for canceling the locking is arranged on a moving path of the locking member so as to cancel the locking. Further, the locking cancellation preventing member is a portion for recognizing a history of insertion and removal of the recording medium.

7 Claims, 13 Drawing Sheets

DISC CARTRIDGE

CROSS REFERENCE TO RELATED APPLICATION

This is a continuation of U.S. application Ser. No. U.S. application Ser. No. 09/229,745, filed Apr. 27, 1999, now U.S. Pat. No. 6,400,678 B1, which is a continuation-in-part of U.S. application Ser. No. 09/233,205, filed Jan. 19, 1999, now U.S. Pat. No. 6,349,087, by some of the inventors herein, the subject matter of the aforementioned applications being incorporated by reference herein and this application relates to copending application Ser. No. 09/528,186, filed Mar. 17, 2000.

BACKGROUND OF THE INVENTION

1. Field of the Invention

The present invention relates to a disc cartridge which receives a disc-like recording medium such as an optical disc, a photomagnetic disc and the like therewithin.

2. Description of the Prior Art

Conventionally, the discs such as the optical disc and the like are used for a disc-like recording medium- These discs are frequently used in a state of being received within the disc cartridge for the purpose of preventing a recording or reproducing error due to an attachment of oils and fats on a recording surface thereof.

In this case, the disc-like recording medium is structured such that in the case that a recording density is fixed, a recording capacity of course becomes greater as a diameter thereof becomes greater. On the contrary, in the case of using the disc-like recording medium mentioned above as a recording medium for a portable recording and reproducing apparatus, for example, a video camera and the like, a compact disc is excellent in portability. Accordingly, there is a case that the disc used for a portable apparatus has a different diameter from the disc used for a stationary apparatus. At this time, a small-sized disc cartridge is of course used for a disc cartridge used for the portable disc. In the case that a recording method is the same and only a shape of the disc is different, if it is possible to mount the disc to the recording and reproducing apparatus, it is possible to record or reproduce by means of recording and reproducing means provided in the recording and reproducing apparatus. Therefore, it is possible to record and reproduce the disc used for the portable apparatus in the stationary recording and reproducing apparatus by taking out only the disc from the compact disc cartridge and replacing in the disc cartridge having the same outer shape as that of the disc cartridge in the stationary apparatus.

Further, in an optical disc, a recording operation is sensitive to a dirt and a reproducing operation is relatively strong to a dirt, so that in the case of performing only a reproducing operation without again performing a recording operation in the once recorded disc, there exists a system in which a disc is taken out from the disc cartridge and only the disc can be treated.

Because of the reasons mentioned above, there is a requirement of inserting and removing the disc with respect to the disc cartridge. As a structure of taking out the disc from the disc cartridge, for example, there is a method of arranging a disc insertion and removal portion in a part of the disc cartridge as shown in Japanese Patent Unexamined Publication No. 5-242626.

A description will be given of a structure for taking out the disc from the disc cartridge in accordance with the conventional art with reference to FIG. 9. A disc insertion and removal port 12 is provided on a surface opposite to a surface on which a shutter 3 is arranged, and a disc insertion and removal port opening and closing member 10e is arranged there. Normally, the disc insertion and removal port opening and closing member 10e is structured such that a locking hook 6e is fitted to a locking hole 7e arranged in the disc cartridge and the disc insertion and removal port 12 is closed. At a time of taking out a disc 4, the locking hook 6e is removed from the locking hole 7e and the disc insertion and removal port opening, closing member 10e is rotated around a rotational support point 8e and the disc insertion and removal port 12 is opened, so that the disc 4 is inserted and removed.

Further, another conventional embodiment is shown in FIG. 10. In the conventional embodiment shown in FIG. 10, a disc insertion and removal port opening and closing member 10f is structured such as to be capable of being taken out from the disc cartridge 1. Further, at a time of attaching the disc insertion and removal port opening and closing member 10f, the disc insertion and removal port opening and closing member 10f is locked by a fitness between a locking hook 6f and a locking hole 7f, thereby preventing an erroneous falling off.

In the disc cartridge as mentioned above, in the case of using the disc cartridge receiving disc once taken out therewithin in the recording and/or reproducing apparatus corresponding to the cartridge, it is necessary that the apparatus detects the fact of being taken out. This is necessary for the purpose of inhibiting a recording operation of the disc which has been taken out to an outer portion or more frequently performing a recording check since a recording operation is sensitive to a dirt in the optical disc as mentioned above. A method of detecting a history of taking out the disc will be described below with reference to FIG. 11. FIG. 11 shows a structure of opening and closing the disc insertion and removal port 12 by a disc insertion and removal port opening and closing member 10i in the same manner as that of the embodiment shown in FIG. 9, thereby inserting and removing the disc. A locking hook 6i and a locking hole 7i are fitted to each other and the locking member 11 is fitted to the locking hole 9, whereby a locking of the disc insertion and removal port opening and closing member 10i is performed. When the locking hook 6i is removed from the locking hole 7i, the locking hook 6i is elastically deformed in an inner direction of the disc cartridge, so that a fitting can be again performed even after once removed. On the contrary, when removing the locking member 11 from the locking hole 9, the locking member 11 is broken out from the disc insertion and removal port opening and closing member 10i.

When opening the disc insertion and removal port opening and closing member 10i, it is necessary to release these two kinds of locking means, however, when opening the disc insertion and removal port opening and closing member 10i, the locking member 11 becomes in a broken state, so that it is possible to recognize a history of taking out the disc by detecting the broken state.

As mentioned above, in the conventional and reference arts, when taking out the disc from the disc cartridge, the disc takeout history is definitely left in the disc cartridge. However, as a purpose of taking out the disc, in addition to the case of using a simple disc exclusively for reproducing the disc, there is a case of using the disc with moving the disc between the disc cartridges. In this case, since a user does not positively handle the disc, there is a little possibility that a dirt is attached to the disc surface. Further, it can be avoided to be directly in contact with the disc by closely attaching the insertion and removal ports of the disc cartridge to each other and moving the disc, so that a dirt is not attached. Even in this case, when the disc take-out history is left, an impossible recording treatment or an excessive recording check is performed although no dirt is attached to the disc, so that a usability of the disc is deteriorated.

DISCLOSURE OF RELATED APPLICATION

U.S. application Ser. No. 09/233,205 (U.S. Pat. No. 6,349,087) discloses the use of a disc holder for holding the disc and which is insertable and removable from the disc cartridge together with the disc. FIG. 12 shows a disc insertion and removal member in accordance with the copending application, wherein a disc insertion and removal opening and closing member 10g is structured such as to be capable of being taken out from the disc cartridge 1. At a time of attaching the disc insertion and removal port opening and closing member 10g, the disc insertion and removal port opening and closing member 10g is locked by a fitness between a locking hook 6g and a locking hole 7g. It is structured such that the disc 4 can be taken out of the disc cartridge 1 by a disc auxiliary member 2 which changes and holds the disc as described in the copending application and is arranged in the disc insertion and removal port opening and closing member 10g at a time of taking out the disc insertion and removal opening and closing member 10g.

FIG. 13 illustrates another form of a disc holding member wherein a disc insertion and removal opening and closing member 10h is structured such as to be capable of being taken out from the disc cartridge 1. At a time of attaching the disc insertion and removal port opening and closing member 10h, the disc insertion and removal port opening and closing member 10h is locked by a fitness between a locking hook 6h and a locking hole 7h. It is structured such that the disc 4 can be taken out of the disc cartridge 1 in a state of being held by a disc holding member 5 which is a variation of the disc auxiliary member 2 and is arranged in the disc insertion and removal port opening and closing member 10h when taking out the disc insertion and removal opening and closing member 10h.

SUMMARY OF THE INVENTION

An object of the present invention is to provide a disc cartridge structured such that a history of taking out a disc is left in the disc cartridge in the case of taking out the disc for the purpose of using the simple disc and is not left in the disc cartridge in the case that a use does not positively handle the disc such as a movement of the disc between the disc cartridges.

In order to achieve the object, in accordance with the present invention, there is provided a disc cartridge in which a disc insertion and removal port can be opened and closed by an insertion and removal port opening and closing member, and locking means for locking the insertion and removal port opening and closing member when the insertion and removal port opening and closing member is closed and locking cancellation preventing means for preventing the locking means from canceling the locking of the insertion and removal port opening and closing member are arranged in the disc cartridge.

Further, the locking cancellation preventing means is formed in a shape structured such as to cover at least a part of a portion in which the locking means is exposed to an outer portion of the disc cartridge.

Still further, at least a part of the locking cancellation preventing means is irreversibly displaced so as to expose at least a part of the locking means which the locking cancellation preventing means covers to an outer portion of the disc cartridge.

Furthermore, at least a part of the locking cancellation preventing means is arranged on a moving path necessary for the locking means to cancel the locking.

Moreover, the locking cancellation preventing means is irreversibly displaced out of the moving path from the moving path of the locking means and the locking means is made movable so as to cancel the locking.

Further, the locking cancellation preventing means is irreversibly displaced out of the moving path from the moving path of the locking means and the locking means is moved in a state of displacing the locking cancellation preventing means so as to cancel the locking.

Still further, the history of the insertion and removal of the disc can be recognized by detecting the state of the locking cancellation preventing means.

DESCRIPTION OF THE PREFERRED EMBODIMENT

Embodiments in accordance with the present invention will be described below with reference to FIGS. 1 to 8.

Figure 1:
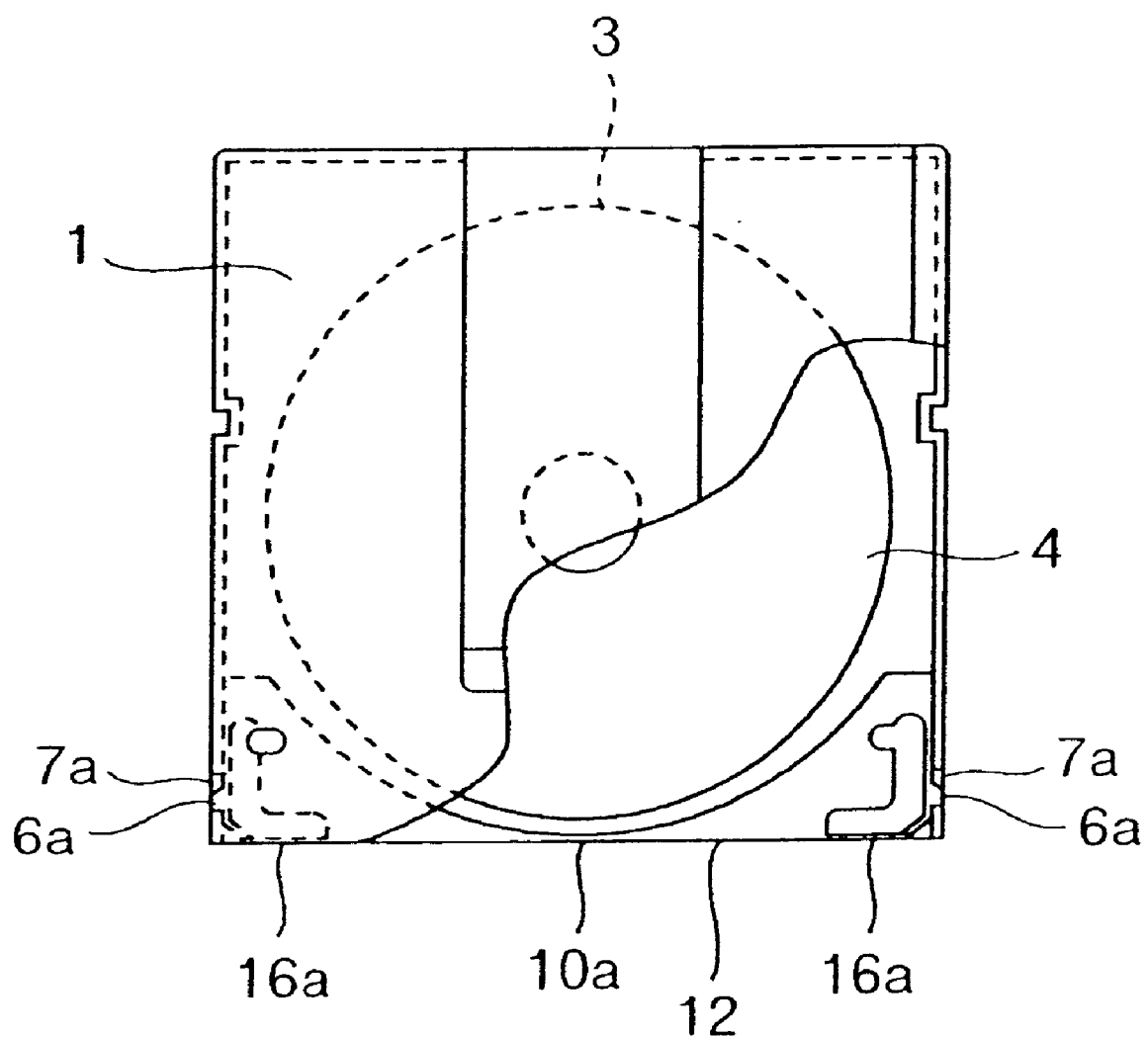
FIG. 1 is a schematic view of a first embodiment in accordance with the present invention, which shows a structure of a disc cartridge.

A first embodiment in accordance with the present invention will be described below with reference to FIGS. 1 to 3. FIG. 1 is a schematic view which shows an internal structure of a disc cartridge in accordance with the first embodiment of the present invention. As shown in FIG. 1, a disc cartridge I is provided with a disc insertion and removal port through which a disc 4 passes when inserting and removing the disc 4. When the disc cartridge 1 receives the disc 4 therewithin, a disc insertion and removal port opening and closing member 10a is locked to the disc insertion and removal port 12 by locking means.

The locking means in accordance with the present embodiment is constituted by a locking hook 6a and a locking hole 7a and is structured such that the locking hook 6a is fitted to the locking hole 7a, thereby being locked. In this case, the locking hole 7a is structured such as not to pass through, and such that it is impossible to cancel the locking from an outer portion of the disc cartridge 1 through the locking hole 7a.

Figure 2A:
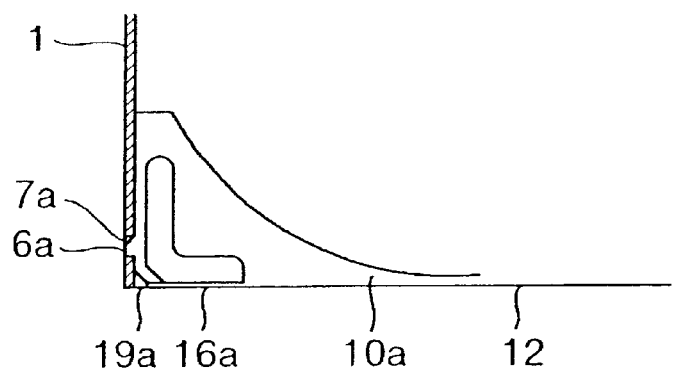
FIGS. 2A–2C are schematic views of the first embodiment in accordance with the present invention, which shows a structure of locking means and locking cancellation preventing means of disc insertion and removal port opening and closing means.
Figure 2B:
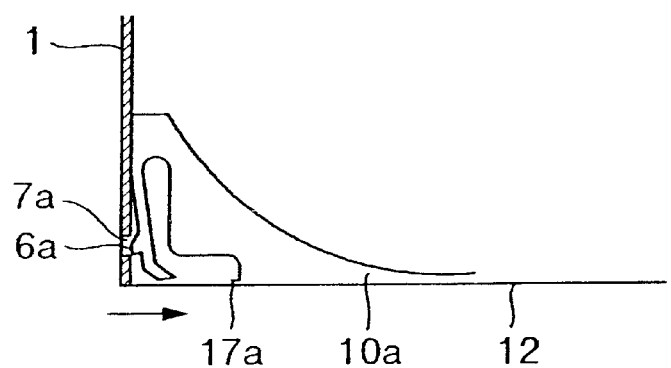
Figure 2C:
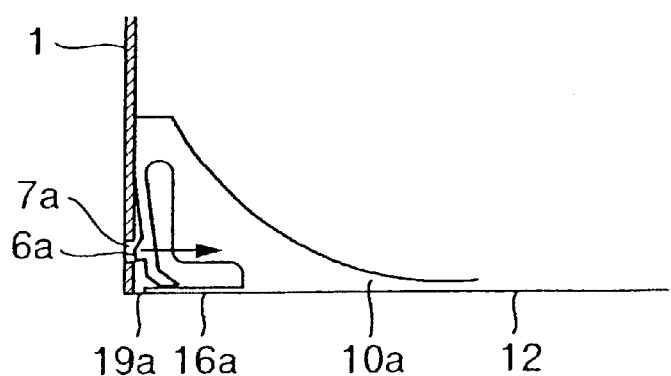
Figure 3A:
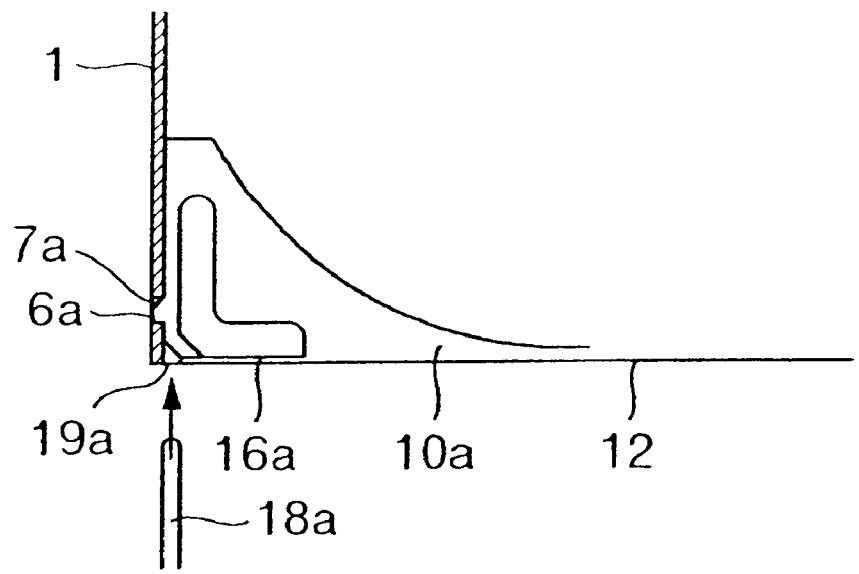
FIGS. 3A and 3B are schematic views of the first embodiment in accordance with the present invention, which explains a method of locking and removing the locking means of the disc insertion and removal port opening and closing means without breaking the locking cancellation preventing means.

In FIG. 2, a locking state of the locking means and a method of canceling the locking will be described. FIG. 2 is a schematic view which shows details of a locking cancellation preventing member 16a corresponding to the locking means and the locking cancellation preventing means. When the disc insertion and removal port opening and closing member 10 is attached to the disc cartridge 1, the locking hook 6a is fitted and locked to the locking hole 7a as shown in FIG. 2A. Further, since the locking cancellation preventing member 16a is arranged in a lower portion of the locking hook 6a, the locking hook 6a is hardly exposed to an outer portion, so that it is hard for a user of the disc cartridge to take out the locking hook 6a from the locking hole 7a in this state. When the user takes out the disc from the disc cartridge 1 for the purpose of using the disc as a single one, the locking cancellation preventing member 16a is broken leaving a broken portion 17a as shown in FIG. 2B. The locking hook 6a is exposed to an outer portion by breaking the locking cancellation preventing member 16a so as to take out, so that it is possible to remove the locking hook 6a. In this case, the take-out history is recognized by detecting the breakage of the locking cancellation preventing member 16a as represented by the broken portion 17a. Further, in the case that it is not desired to mark the disc take-out history such as a movement of the disc between the disc cartridges, the disc is taken out by removing the locking hook 6a without breaking the locking cancellation preventing member 16a as shown in FIG. 2C.

Figure 3B:
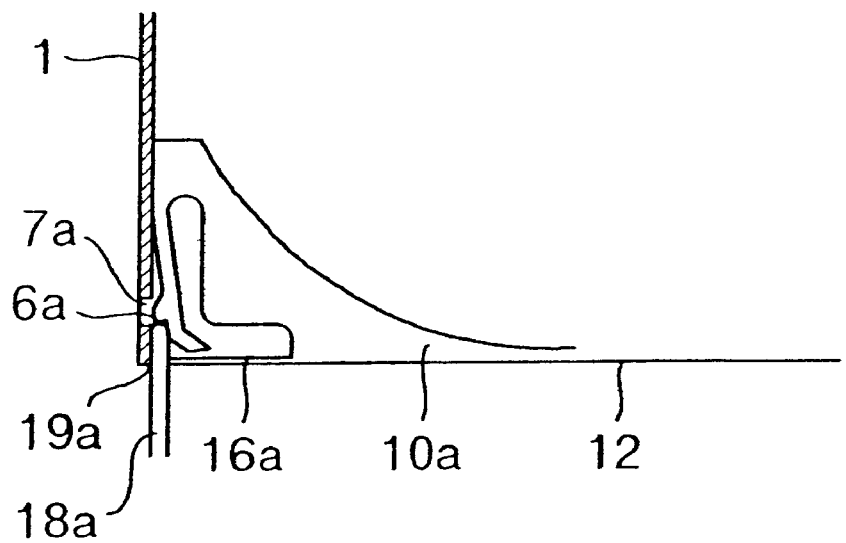

A description will be given of a method of removing the locking hook 6a without breaking the locking cancellation preventing member 16a with reference to FIG. 3. An opening portion 19a which is small enough that the user can not operate the locking hook 6a by a finger is provided between the locking cancellation preventing member 16a and the disc cartridge 1. The locking hook 6a is moved by inserting the locking cancellation member 18a from the opening portion 19a, as shown in FIG. 3B, thereby being removed from the locking hole 7a. A locking cancellation member 18a is, for example, provided near the disc insertion and removal portion of the disc cartridge in a destination for the disc, so that a cancellation of the locking and a moving operation of the disc can be both performed by pressing the disc cartridge 1 in accordance with the present invention.

Figure 4:
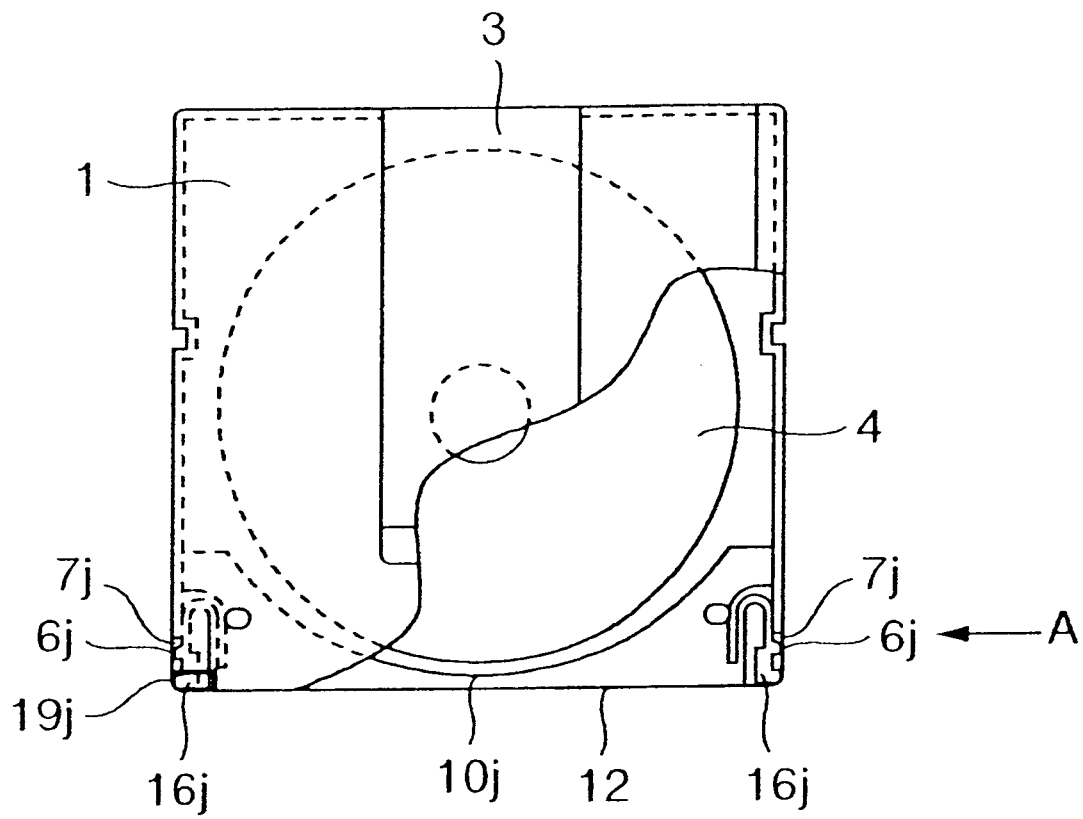
FIG. 4 is a schematic view of a second embodiment in accordance with the present invention, which shows a structure of a disc cartridge.
Figure 4:
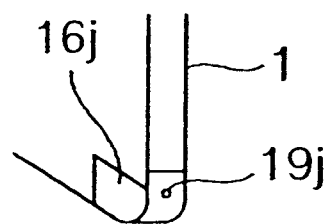
Figure 5A:
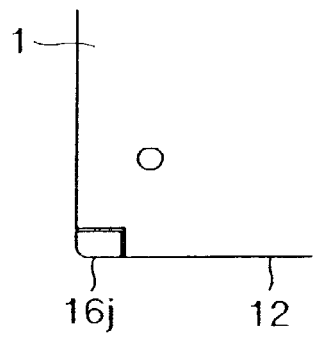
FIGS. 5A–5C are schematic views of the second embodiment in accordance with the present invention, which shows a structure of locking means and locking cancellation preventing means of disc insertion and removal port opening and closing means.
Figure 5A:
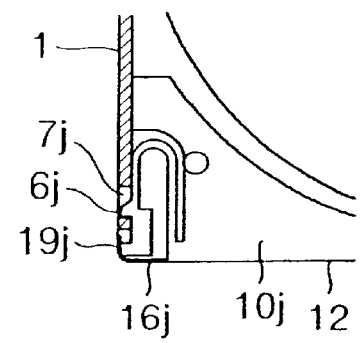
Figure 5B:
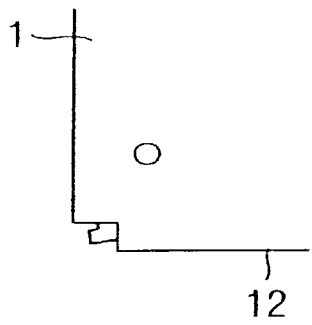
Figure 5B:
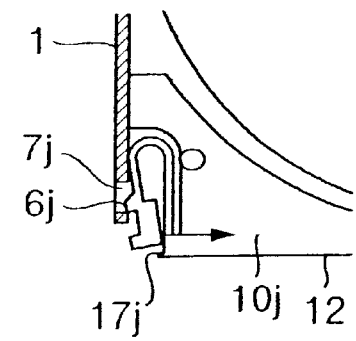
Figure 5C:
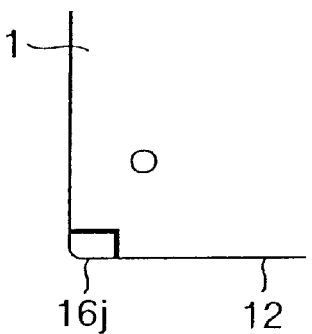
Figure 5C:
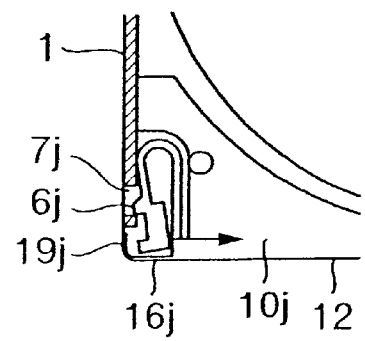
Figure 6A:
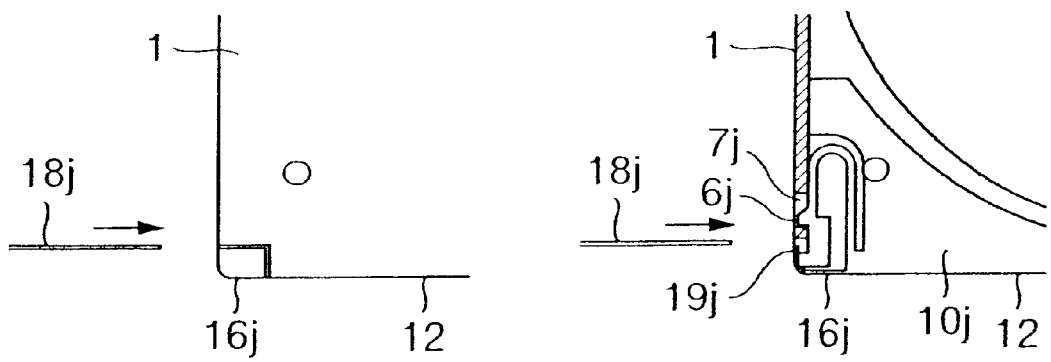
FIGS. 6A and 6B are schematic views of the second embodiment in accordance with the present invention, which explains a method of locking and removing the locking means of the disc insertion and removal port opening and closing means without breaking the locking cancellation preventing means.

Next, a second embodiment in accordance with the present invention will be described below with reference to FIGS. 4 to 6. FIG. 4 is a schematic view which shows a structure of a disc cartridge in accordance with the second embodiment of the present invention. The present embodiment has the disc insertion and removal port 12 in the same manner as that of the first embodiment, and when the disc cartridge I receives the disc 4 therewithin, a disc insertion and removal port opening and closing member 10j is locked to the disc insertion and removal port 12 by locking means. The locking means in accordance with the present embodiment is also constituted by a locking hook 6j and a locking hole 7j, and the locking hook 6j is fitted to the locking hole 7j so as to be locked. Further, in the case of the disc cartridge which has not taken out the disc, the structure is made such that the disc cartridge 1 and the locking cancellation preventing member 16j cover almost all of the member having the locking hook 6j. In this case, the locking hole 7j is not penetrated, so that it is structured such that it is impossible to cancel the locking by inserting into the locking hole 7j from the outer portion of the disc cartridge 1.

A description will be given of a locking state of the locking means and a method of canceling the locking with reference to FIG. 5. FIG. 5 is a schematic view which shows a detail of the locking cancellation preventing member 16j corresponding to the locking means and the locking cancellation preventing means. Left views in FIGS. 5A to 5C are outside drawings near a portion in which the locking cancellation preventing member 16j is arranged, and right views show an inner structure thereof. When the disc insertion and removal port opening and closing member 10j is attached to the disc cartridge 1, the locking hook 6j is fitted and locked to the locking hole 7j as shown in FIG. 5A. Further, since the disc cartridge 1 and the locking cancellation preventing member 16j cover almost all of the surface in the member having the locking hook 6j, it is hard for the user of the disc cartridge to remove the locking hook 6j from the locking hole 7j. In order that the user uses the disc as a single unit, it is necessary to break the locking cancellation preventing member 16j and leave a broken portion 17j, expose a lower portion of the member having the locking hook 6j to an outer portion and displace the portion in a direction of an arrow so as to take out the locking hook 6j, as shown in FIG. 5B. In this case, the disc apparatus recognizes the disc take-out history of the disc cartridge 1 by detecting the breakage of the locking cancellation preventing member 16j as represented by the broken portion 17j. Further, in the case that it is not desired to mark the disc take-out history such as a movement of the disc between the disc cartridges, the disc is taken out by removing the locking hook 6j without breaking the locking cancellation preventing member 16j as shown in FIG. 5C.

Figure 6B:
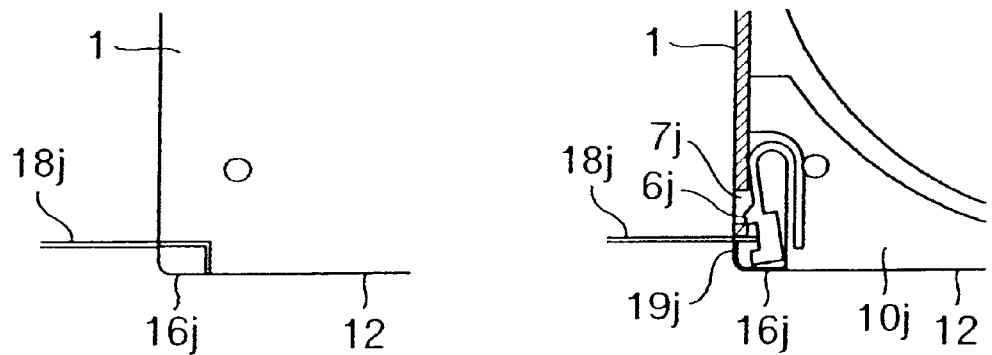

Next, a description will be given of a method of removing the locking hook 6j without breaking the locking cancellation preventing member 16j with reference to FIG. 6. An opening portion 19j which is small enough that the user can not operate the locking hook 6j by a finger is provided between the locking cancellation preventing member 16j and the disc cartridge 1. The locking hook 6j is moved by inserting the locking cancellation member 18j from the opening portion 19a, as shown in FIG. 6B, thereby being removed from the locking hole 7j. A locking cancellation member 18j is, for example, provided within the disc cartridge in a destination for the disc, so that the disc is moved by moving the locking cancellation preventing member 18j and canceling the locking after pressing the disc cartridge 1 in accordance with the present invention. Further, in the case of the present embodiment, as is different from the first embodiment, the locking cancellation preventing member 16j is exposed to a front surface of the disc cartridge or a back surface thereof. Accordingly, it is possible to detect the take-out history from the surface of the disc cartridge 1 or the back surface thereof, so that it is possible to increase a freedom in designing an arrangement of a sensor in the side of the disc apparatus.

Figure 7A:
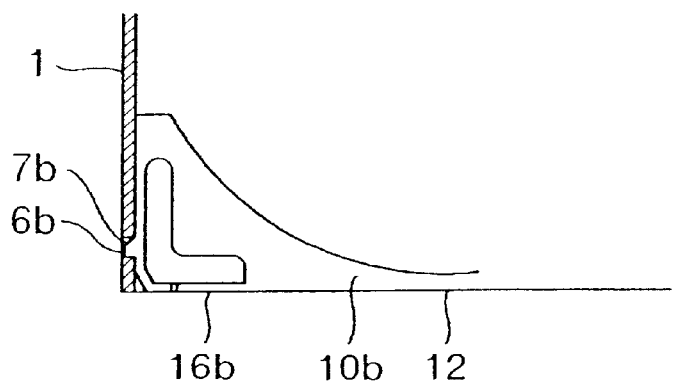
FIGS. 7A–7C are schematic views of a third embodiment in accordance with the present invention, which shows a structure of locking means and locking cancellation preventing means of disc insertion and removal port opening and closing means.
Figure 7B:
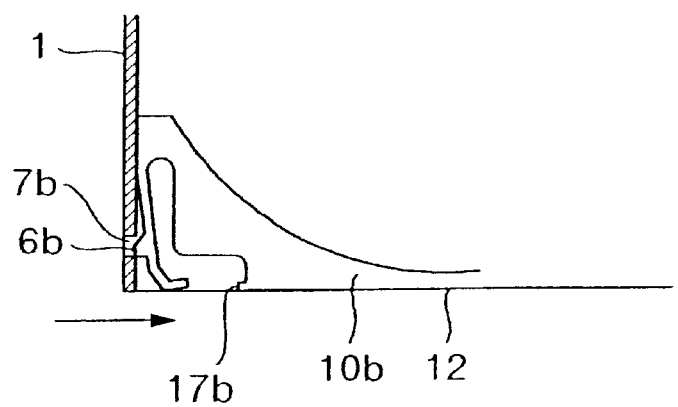
Figure 7C:
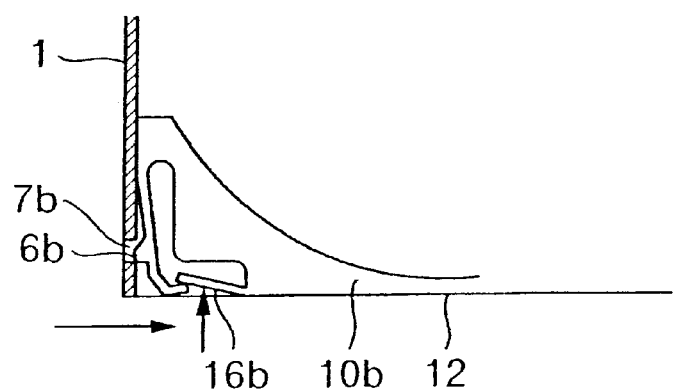

Next, a third embodiment in accordance with the present invention will be described below with reference to FIGS. 7 and 8. FIG. 7 is a schematic view which shows a locking state of locking means and a method of canceling the locking in accordance with the third embodiment of the present invention. The locking hook 6b is fitted to the locking hole 7b so as to perform the locking in the same manner as that of the first embodiment. Further, in order to take out the locking hook 6b from the locking hole 7b, it is necessary to move in an inner direction of the disc cartridge 1, however, a locking cancellation preventing member 16b is arranged on the moving path. In this state, the locking hook 6b is interfered with the locking cancellation preventing member 16b and can not be moved, so that the locking can not be canceled. When taking out the disc from the disc cartridge 1 in order that the user uses the disc as a single unit, the locking cancellation preventing member 16b is broken leaving a broken portion 17b as shown in FIG. 7B. The locking hook 6b can be moved by breaking the locking cancellation preventing member 16b so as to take out, so that it is possible to take out the locking hook 6b. In this case, the disc apparatus recognizes the disc take-out history by detecting the breakage of the locking cancellation preventing member 16b as represented by the broken portion 17b. Further, in the case that it is not desired to mark the disc take-out history such as a movement of the disc between the disc cartridges, the locking cancellation is performed by elastically deforming the locking cancellation preventing member 16b and moving the locking hook 6b in this state, as shown in FIG. 7C.

Figure 8A:
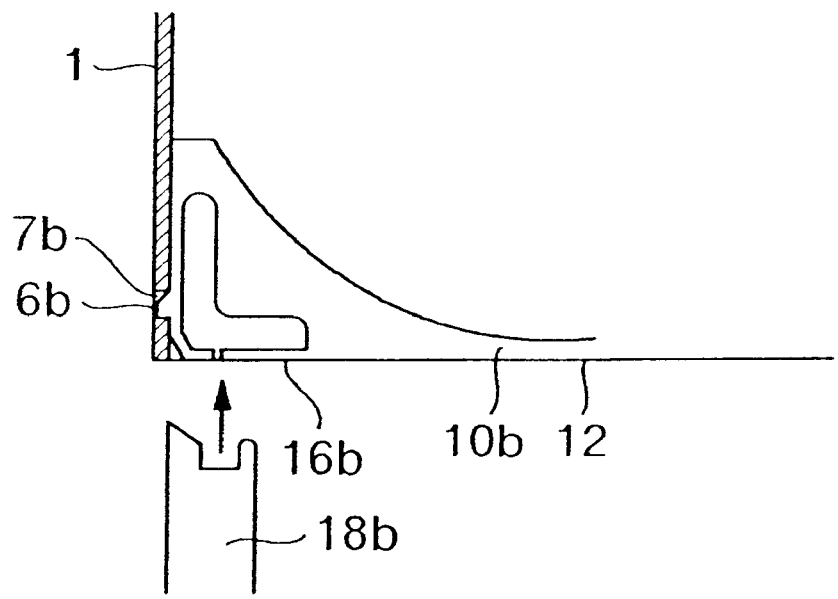
FIGS. 8A and 8B are schematic views of the third embodiment in accordance with the present invention, which explains a method of locking and removing the locking means of the disc insertion and removal port opening and closing means without breaking the locking cancellation preventing means.
Figure 8B:
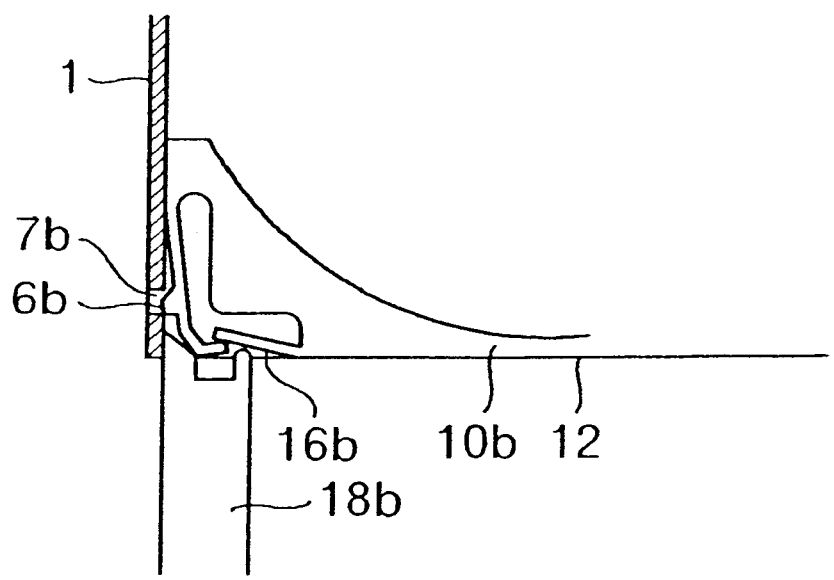
Figure 9:
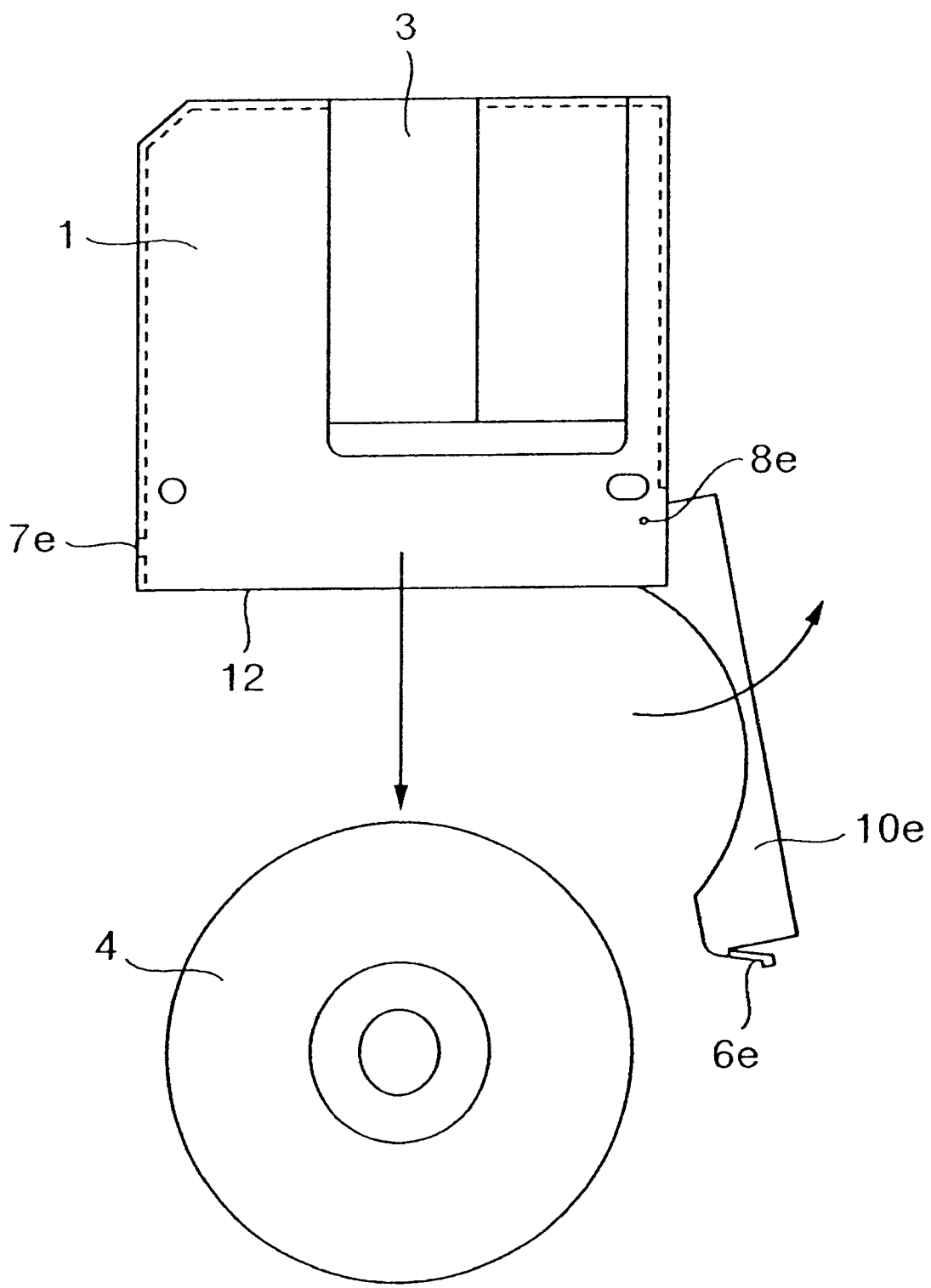
FIG. 9 is a schematic view of a conventional art, which shows a structure of inserting and removing a disc in a disc cartridge.
Figure 10:
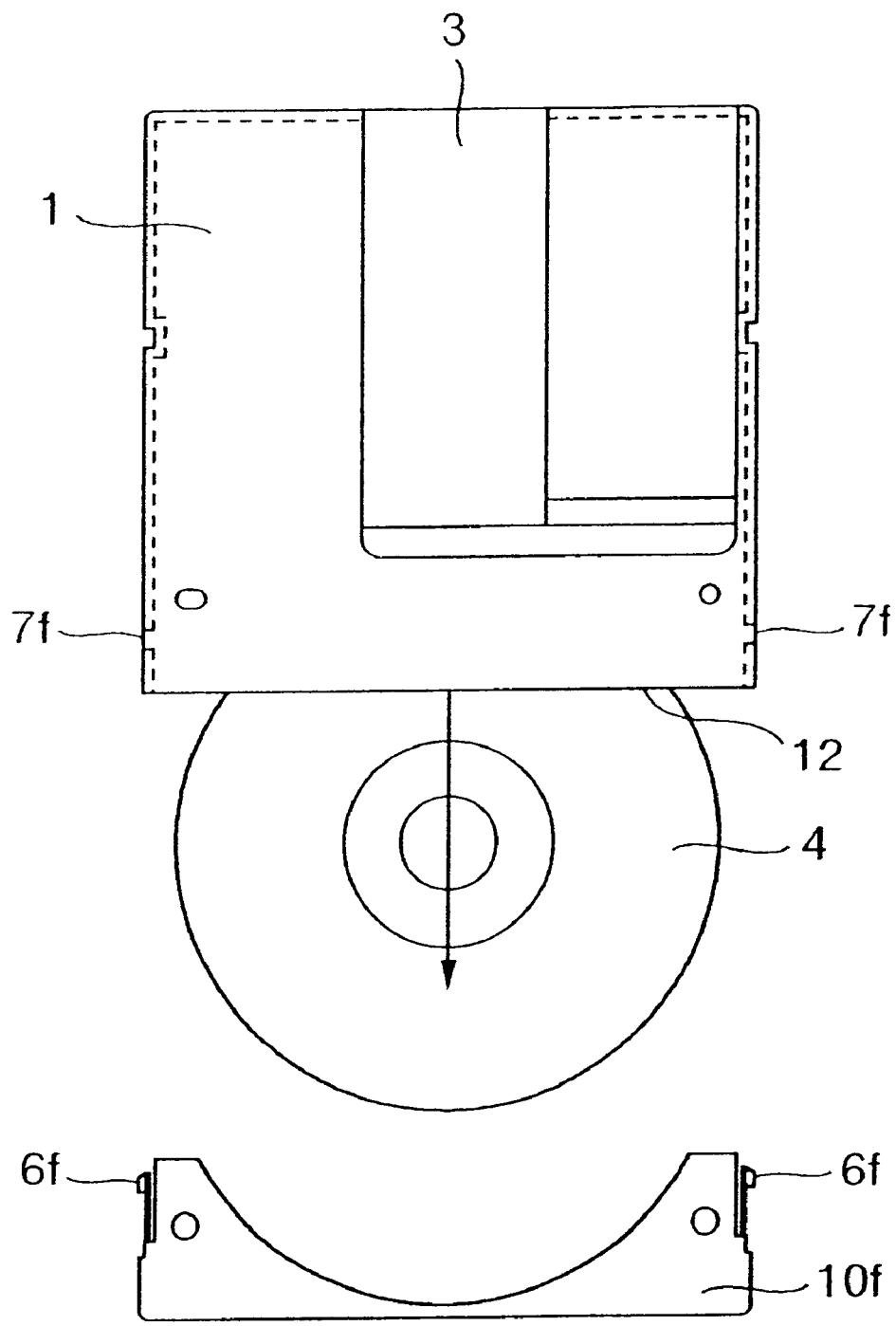
FIG. 10 is a schematic view of a conventional art, which shows a structure of inserting and removing a disc in a disc cartridge.
Figure 11:
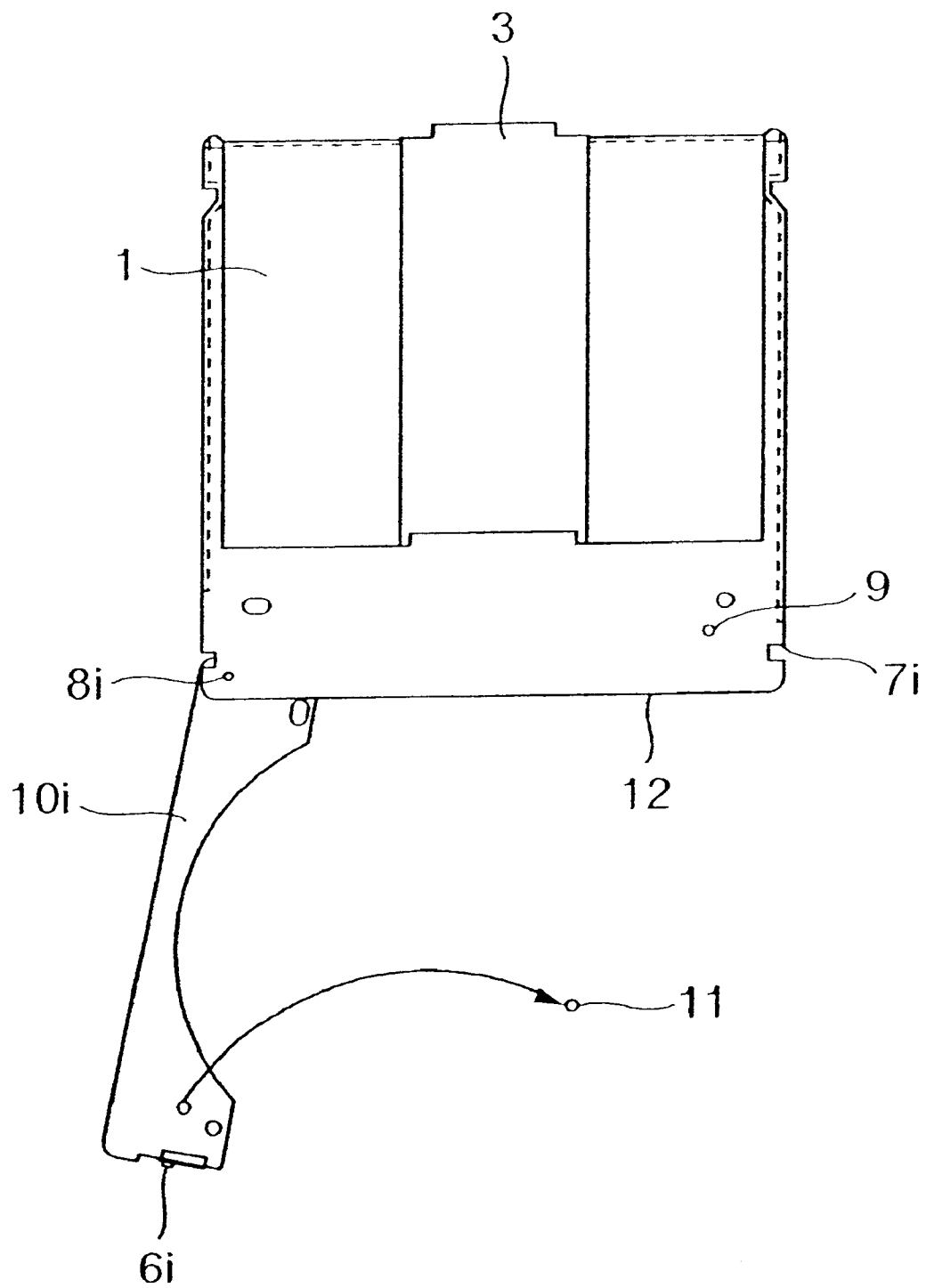
FIG. 11 is a schematic view of a conventional art, which shows a structure of a history of taking out a disc in a disc cartridge.
Figure 12:
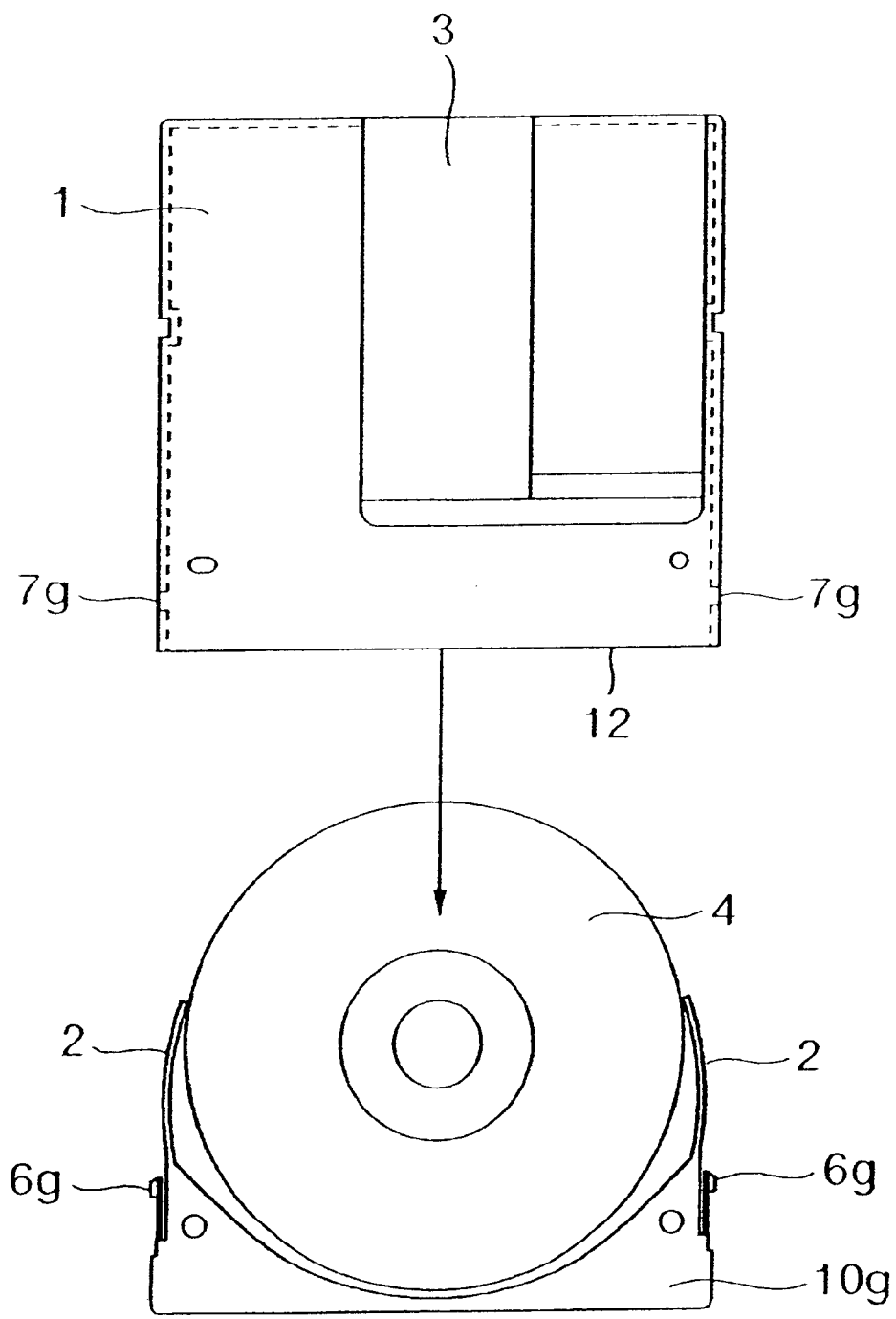
FIG. 12 is a schematic view in accordance with the disclosure of the copending application, which shows a structure of inserting and removing a disc in a disc cartridge.
Figure 13:
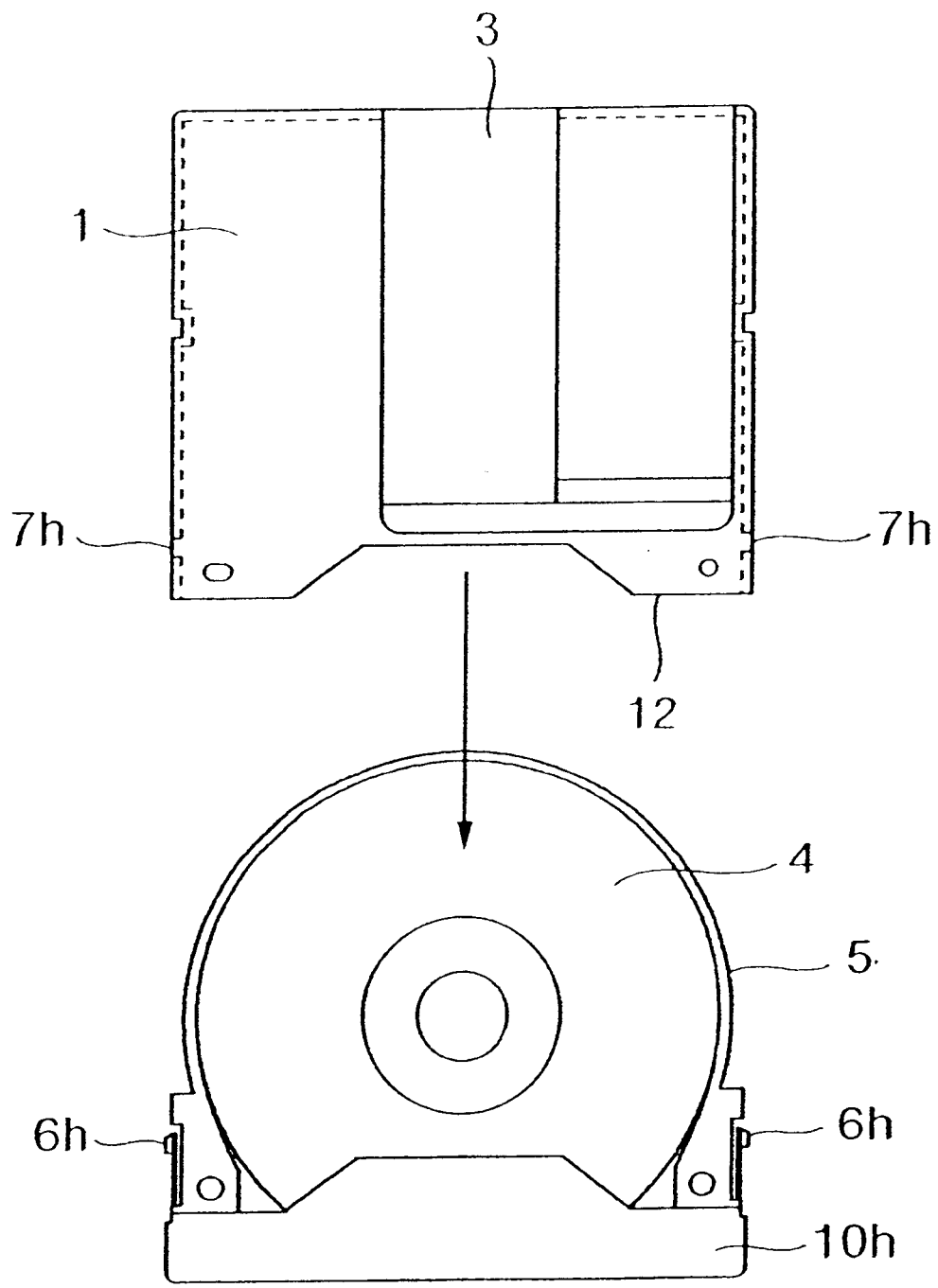
FIG. 13 is a schematic view in accordance with the disclosure of the copending application, which shows a structure of inserting and removing a disc in a disc cartridge.

A description will be given of a method of taking out the locking hook 6b while deforming the locking cancellation preventing member 16b with reference to FIG. 8. It is necessary that a deformation of the locking cancellation preventing member 16b and a movement of the locking hook 6b are performed substantially at the same time. Accordingly, as shown in FIG. 8A, by pressing a locking cancellation member 18b having a fork-like front end portion to the locking hook 6b and the locking cancellation preventing member 16b, it is possible to move the locking hook 6b while deforming the locking cancellation preventing member 16b as shown in FIG. 8B so as to be taken out from the locking hole 7b. The locking cancellation member 18b is, for example, provided near a disc insertion and removal port of the disc cartridge in a destination for the disc, and a cancellation of the locking and a moving operation of the disc can be both performed by pressing the disc cartridge 1 in accordance with the present invention.

As mentioned above, the present invention can provide the disc cartridge structured such that a history of taking out the disc is left in the disc cartridge in the case that the user takes out the disc and uses the disc as a single unit, and a history of taking out the disc is not left in the disc cartridge in a state that the user does not positively perform a handling of the disc such as a movement of the disc between the disc cartridges.

In accordance with the structure mentioned above, in the case that the user takes out the disc and uses the disc as a single unit, a history of taking out the disc is left in the disc cartridge, and in a state that the user does not positively perform a handling of the disc such as a movement of the disc between the disc cartridges, a history of taking out the disc is not left in the disc cartridge.

What is claimed is:

1. A disc cartridge for receiving a disc-shaped recording medium therewithin, comprising:

said recording medium which is insertable and removable from said disc cartridge, said disc cartridge having an insertion and removal port opening and closing member; and said disc insertion and removal port opening and closing member being moved from said disc cartridge when taking out said recording medium;

wherein said disc cartridge has a locking member for locking said insertion and removal port opening and closing member, said locking member being movable along an inwardly directed moving path from a locking position with respect to an outer portion of said disc cartridge toward another position in a direction of a central portion of said disc cartridge;

wherein at least a part of a locking cancellation preventing member which prevents said locking member from moving for canceling the locking is arranged along a portion of said inwardly directed moving path for said locking member at least between said locking position and said another position; and wherein said locking cancellation preventing member is a portion for recognizing a history of insertion and removal of said recording medium.

2. A disc cartridge as claimed in claim 1, wherein said locking cancellation preventing member is irreversibly displaced out of said inwardly directed moving path of said locking member and the locking is canceled by moving said locking member.

3. A disc cartridge as claimed in claim 1, wherein the history of the insertion and removal of said recording medium is recognizable by detecting the state of said locking cancellation preventing member.

4. A disc cartridge as claimed in claim 1, wherein said locking cancellation preventing member is irreversibly displaced out of said inwardly directed moving path of said locking member and said locking member is made movable so as to cancel the locking and recognition of the history of the insertion and removal of said recording medium.

5. A disc cartridge as claimed in claim 1, wherein said inwardly directed moving path of said locking member is a required moving path of said locking member.

6. A disc cartridge as claimed in claim 1, wherein said locking member includes an outgoing engaging portion which engages the outer portion of said disc cartridge in said locking position and said inwardly directed moving path extends inwardly from said locking position towards said another position.

7. A disc cartridge as claimed in claim 6, wherein said engaging portion of said locking member engages a recess of said outer portion of said disc cartridge, and said at least a part of said locking cancellation preventing member is spaced from said engaging portion of said locking member in a direction transverse to said inwardly directed moving path of said locking member.

* * * * *